(12) United States Patent
Yamashita et al.

(10) Patent No.: US 7,273,003 B2
(45) Date of Patent: Sep. 25, 2007

(54) PLUNGER PUMP

(75) Inventors: Jun Yamashita, Tomi (JP); Tomohide Tanaka, Tomi (JP); Atsushi Shimizu, Tomi (JP); Naotoshi Tamai, Tomi (JP); Motoyasu Nakamura, Tomi (JP)

(73) Assignee: Nissin Kogyo Co., Ltd., Nagano-Ken (JP)

( * ) Notice: Subject to any disclaimer, the term of this patent is extended or adjusted under 35 U.S.C. 154(b) by 399 days.

(21) Appl. No.: 10/858,476

(22) Filed: Jun. 2, 2004

(65) Prior Publication Data

US 2005/0002809 A1 Jan. 6, 2005

(30) Foreign Application Priority Data

Jun. 3, 2003 (JP) .............................. 2003-157908

(51) Int. Cl.
*F01B 1/00* (2006.01)
*F01L 15/00* (2006.01)

(52) U.S. Cl. .............................. 91/188; 91/491; 92/72; 417/273

(58) Field of Classification Search .................... 92/72, 92/129; 91/188, 491; 417/273, 470, 521
See application file for complete search history.

(56) References Cited

U.S. PATENT DOCUMENTS

| | | | |
|---|---|---|---|
| 2,423,701 A * | 7/1947 | Hardy | 417/273 |
| 3,092,037 A * | 6/1963 | Rhodes | 417/273 |
| 3,496,880 A * | 2/1970 | Wolff | 92/72 |
| 3,583,286 A * | 6/1971 | Chiappulini | 91/491 |
| 6,078,118 A * | 6/2000 | Reinartz et al. | 417/273 |
| 6,135,093 A | 10/2000 | Kikuchi et al. | |
| 6,216,583 B1 * | 4/2001 | Klinger et al. | 92/129 |
| 6,764,285 B1 * | 7/2004 | Kellner | 417/470 |

FOREIGN PATENT DOCUMENTS

| | | |
|---|---|---|
| JP | 5759980 | 4/1982 |
| JP | 1247742 | 9/1999 |
| JP | 2000-179449 | 6/2000 |
| JP | 538360 | 11/2002 |

OTHER PUBLICATIONS

Office Action issued in Japanese Patent Application No. 2003-157908.
English Language Translation of Oddice Action issued in Japanese Patent Application No. 2003-157908.

* cited by examiner

*Primary Examiner*—Igor Kershteyn
(74) *Attorney, Agent, or Firm*—Greenblum & Bernstein, P.L.C.

(57) ABSTRACT

A plunger pump, includes: a plunger pump unit including a pump chamber and a plunger for pressing a hydraulic fluid in the pump chamber to perform a discharging operation of the hydraulic fluid; a motor; and a cam portion driven by the motor to rotate and press the plunger. The cam portion has at least two discharge regions for pressing the plunger and a suction region formed between the discharge region. The plunger performs the discharging operation two times or more by one rotation of the cam portion.

18 Claims, 3 Drawing Sheets

PLUNGER PUMP

BACKGROUND OF THE INVENTION

1. Field of the Invention

The present invention relates to a plunger pump activated by a motor.

2. Background Art

Hitherto, as an automobile brake mechanism, an antilock brake mechanism (so-called ABS) is known. The antilock brake mechanism realizes stable braking by, for example, controlling a fluid pressure of a hydraulic fluid supplied to a brake at the time of braking on a slippery road surface. The antilock brake mechanism drives, in order to control the fluid pressure of a hydraulic fluid, a plunger pump by rotation of an electric motor (see JP-A-2000-179449, for example).

Such an antilock brake mechanism includes an electronic control unit and a fluid-pressure control unit. The electronic control unit controls operation of various solenoid valves of the fluid-pressure control unit and the electric motor based on information from various sensor systems, for example, a wheel speed sensor. An eccentric shaft portion is provided in a rotating shaft of the electric motor, and on the outer circumference of the eccentric shaft portion, a ball bearing is fitted as a drive member. By urging a plunger by a spring member so as to be always brought in contact with this ball bearing and turning the rotating shaft, the plunger is reciprocated to discharge a hydraulic fluid so as to generate a fluid pressure.

However, in such a plunger pump, a further improvement has been demanded in electric motor vibration due to the eccentric shaft portion and operation noise due to a pulsation of the hydraulic fluid discharged from the plunger pump.

SUMMARY OF THE INVENTION

An object of the present invention is to provide a plunger pump wherein vibration of the electric motor is reduced and operation noise due to a pulsation of a hydraulic fluid discharged from the plunger pump is reduced.

The invention provides a plunger pump, including: a plunger pump unit including a pump chamber and a plunger for pressing a hydraulic fluid in the pump chamber to perform a discharging operation of the hydraulic fluid; a motor; and a cam portion driven by the motor to rotate and press the plunger; wherein the cam portion has at least two discharge regions for pressing the plunger and a suction region formed between the discharge region; and the plunger performs the discharging operation two times or more within one revolution of the cam portion.

According to the invention, a rotating cam portion is provided in place of an eccentric shaft portion having a discharge region at one position as in the related art, and the cam portion has two or more discharge regions. Therefore, vibration due to a motor rotation can be reduced, and pulsation due to a discharge can be dispersed. In addition, since two or more hydraulic fluid discharges can be carried out by one rotation of the cam portion, the discharging amount per each discharge can be reduced, and as a result, the motor vibration and pulsation due to a discharge of the hydraulic fluid can be reduced. Furthermore, if the discharging amount per each discharge is set equal, a discharging amount equivalent to that of the prior art can be achieved even when the rotation speed of the cam portion is reduced, therefore, reduction in the vibration and reduction in the noise thereby can be realized by a reduction in the rotation speed of the motor.

Preferably, the cam portion has an approximately triangular cross section in which the discharge regions are formed at three positions.

According to the invention, vibration due to a motor rotation can be reduced. In addition, compared to a case where discharging regions are formed at four or more positions, the discharging amount can be easily attained and space efficiency is also excellent.

Preferably, the plunger pump further includes: a rolling element; wherein the motor includes an output shaft having an outer circumferential surface on which a cam face including the discharging region of the cam portion is formed; the rolling element is disposed between the cam face and the plunger; the plunger is constantly urged toward the rolling element being in contact therewith to bring the rolling element into contact with the cam face; and the output shaft is rotated by the motor so that the discharge regions press and move the plunger via the rolling element to perform the discharging operation.

According to the invention, the rolling element has a small coefficient of friction in operation, whereby operation noise can be reduced and high temperature due to frictional heat can be prevented.

Preferably, the plunger includes a first plunger and a second plunger; the first plunger is brought in contact with the discharge region; and the second plunger is brought in contact with the suction region when the first plunger is brought in contact with the discharge region.

According to the invention, by bringing the first plunger and second plunger in contact with the discharge region and suction region of the cam portion, respectively, discharges of each plunger are alternately carried out, and the discharging timing slips, therefore, pulsation can be suppressed and operation noise can be reduced.

The invention may provide a plunger pump, including: a pair of plunger pump units each including a pump chamber and a plunger for pressing a hydraulic fluid in the pump chamber to perform a discharging operation of the hydraulic fluid; a cam portion for pressing the plungers of the pair of plunger pump units to perform the discharging operations while rotating; and a motor that drives the cam portion to rotate; wherein the cam portion alternately presses the plungers within one revolution.

Preferably, the plunger pump units are disposed at both sides of the cam portion.

The invention may provide a plunger pump drive unit, include: a motor; a cam portion driven by the motor to rotate and press a plunger to perform a discharging operation of a hydraulic fluid; wherein the cam portion has at least two discharge regions for pressing the plunger and a suction region formed between the discharge region; and the plunger performs the discharging operation two times or more by one rotation of the cam portion.

BRIEF DESCRIPTION OF THE DRAWINGS

The present invention may be more readily described with reference to the accompanying drawings.

DETAILED DESCRIPTION OF THE PREFERRED EMBODIMENTS

Hereinafter, an embodiment of the present invention will be described in detail with reference to the drawings.

Figure 1:
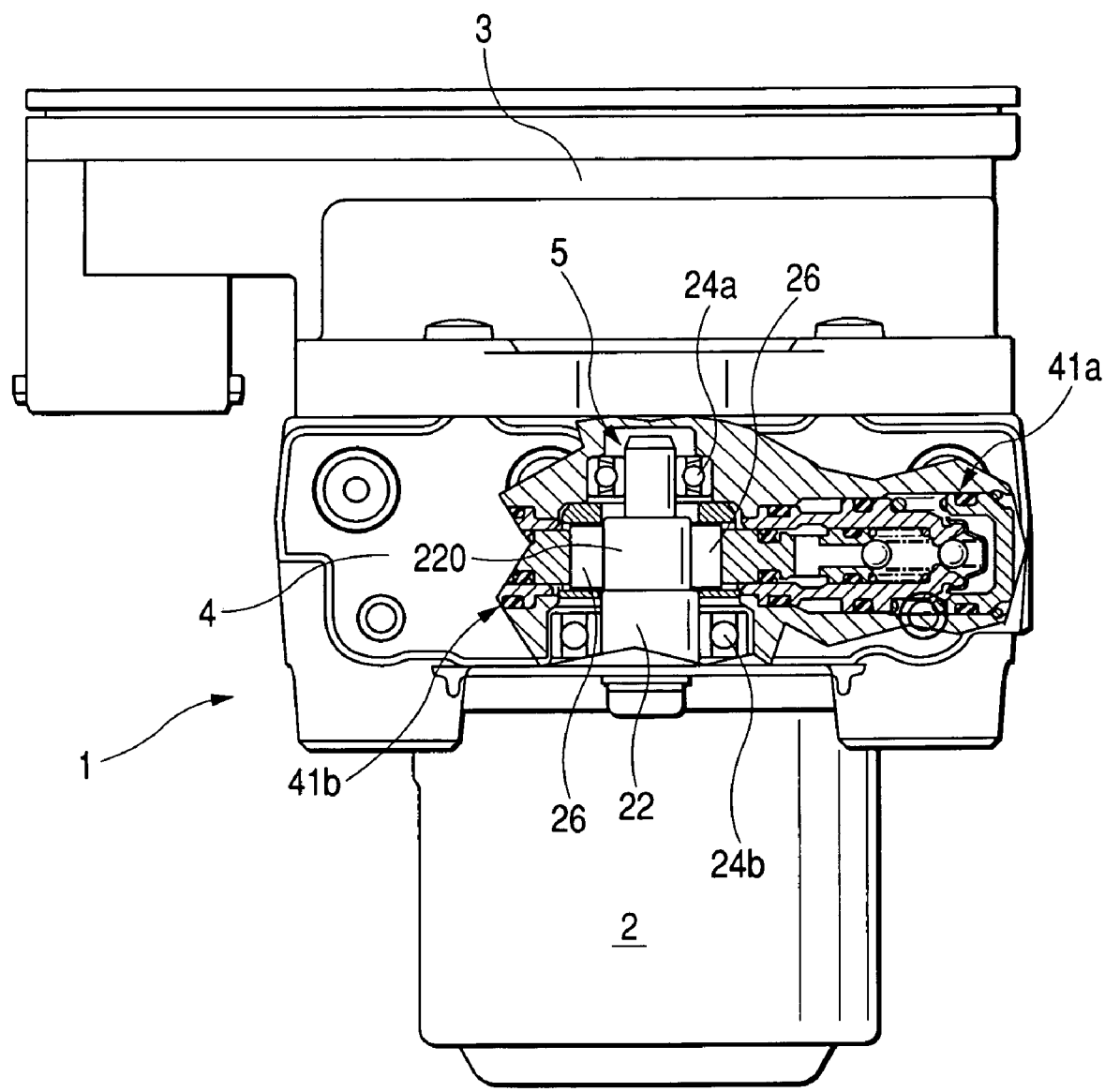
FIG. 1 is a front view showing an antilock brake controller according to an embodiment of the present invention partially by a sectional view.
Figure 2:
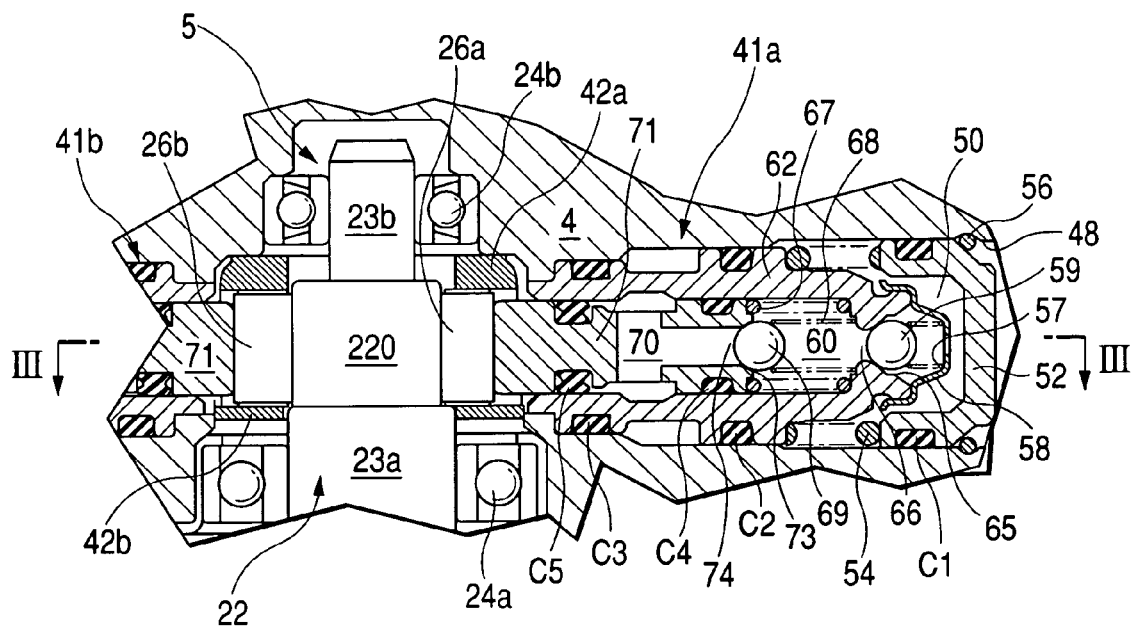
FIG. 2 is an enlarged longitudinal sectional view of a plunger pump and a plunger pump drive unit.
Figure 3:
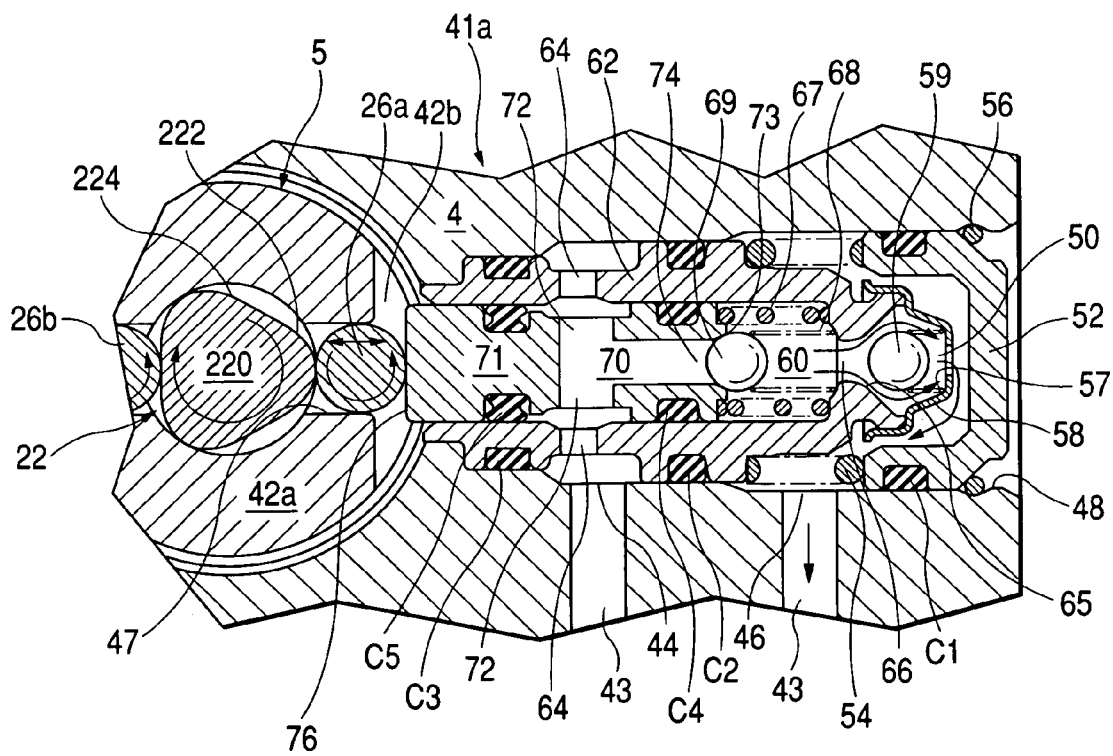
FIG. 3 is a cross sectional view of a plunger pump and a plunger pump drive unit.
Figure 4:
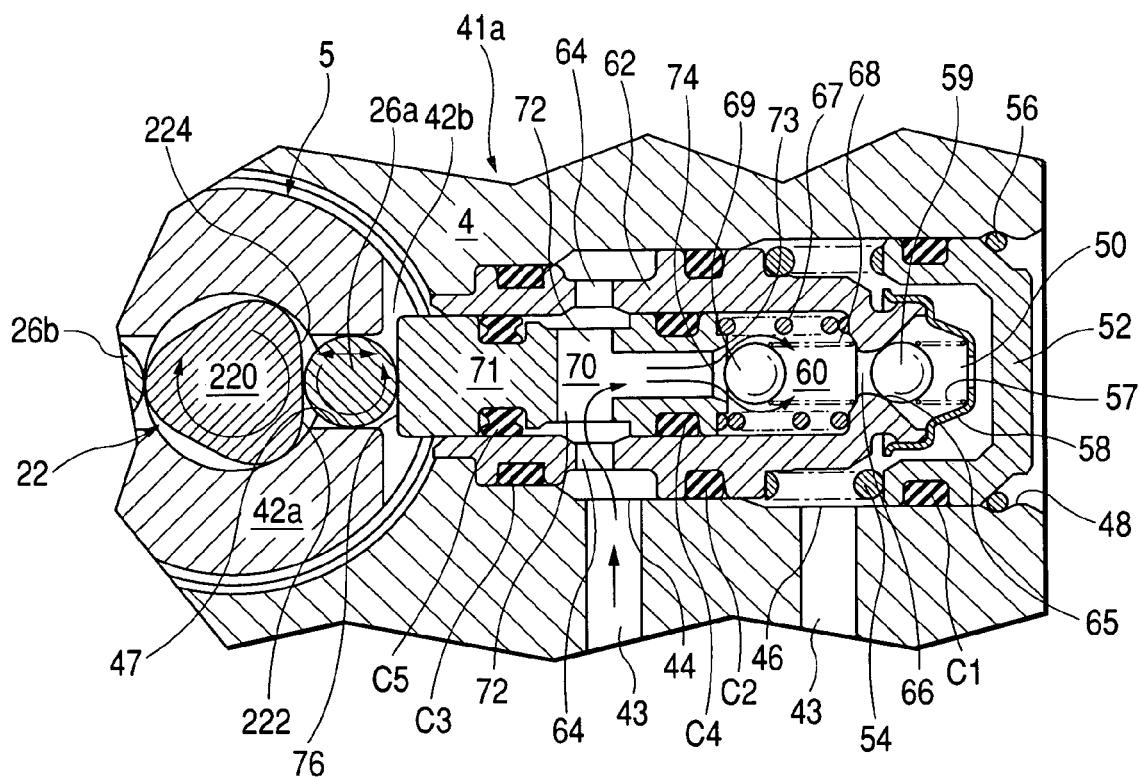
FIG. 4 is a cross sectional view of a plunger pump and a plunger pump drive unit.
Figure 5:
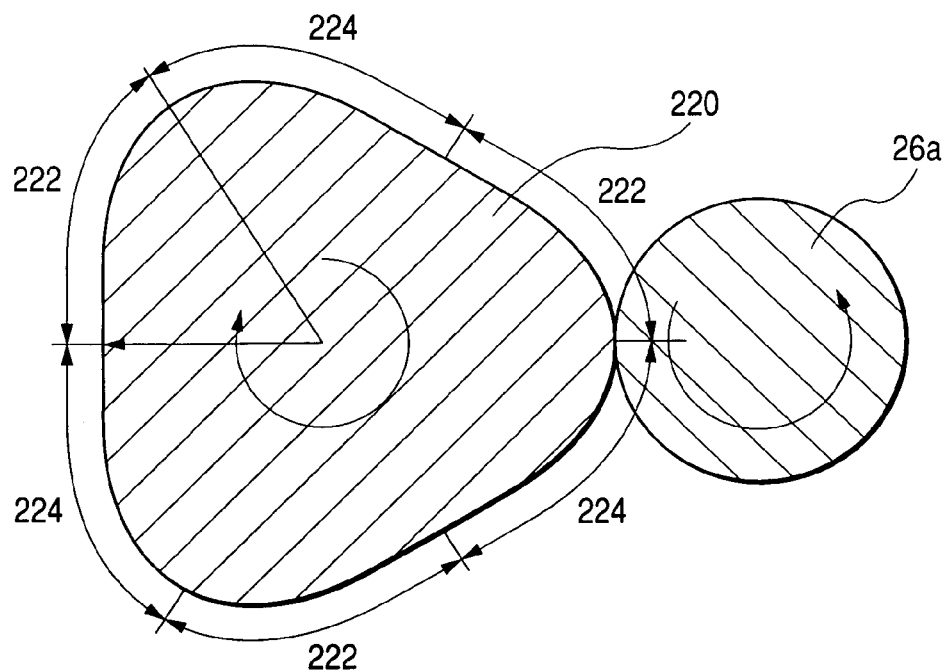
FIG. 5 is an enlarged cross sectional view of a cam portion and a roller.

FIG. 1 is a front view showing an antilock brake mechanism according to an embodiment of the present invention. FIG. 2 is an enlarged view of a longitudinal sectional view of the plunger pump drive unit of FIG. 1. FIG. 3 is a sectional view along III—III of FIG. 2 showing a discharge operation. FIG. 4 is a sectional view along III—III showing a suction operation. FIG. 5 is an enlarged sectional view for explaining the cam portion and roller of FIG. 3.

A plunger pump drive unit 5 according to an embodiment of the present invention as shown in FIG. 1 and FIG. 2 is used for generating a fluid pressure of a hydraulic fluid of an automobile antilock brake system (ABS), for example. An antilock brake controller 1 is, when a vehicle driver brakes by stepping onto a brake pedal, for controlling the brake fluid pressure working on respective wheel brakes. In particular, the antilock brake controller 1 can control, by reducing the brake fluid pressure to a wheel which was nearly locked during the braking, the wheels without locking.

The antilock brake controller 1 includes a fluid pressure control unit and an electronic control unit for electrically controlling this fluid pressure control unit. The fluid pressure control unit comprises the plunger pump drive unit 5 incorporated in a housing 4 and hydraulic components such as unillustrated solenoid valves and plunger pumps 41a and 41b. The electronic control unit comprises an unillustrated substrate disposed in a cover 3 and electronic components disposed on the substrate, and this is electrically connected to an electric motor 2 of the fluid pressure control unit and unillustrated solenoid valves, etc.

The plunger pump drive unit 5 according to an embodiment of the present invention presses and moves plungers 71 and 71 of the two plunger pumps 41a and 41b to discharge a hydraulic fluid. The plunger pump 41b is provided at a position across the plunger pump drive unit 5 from the plunger pump 41a. In addition, the plunger pump drive unit 5 can, by employing a mode of the present invention which will be described in detail in the following, reduce vibration of the electric motor, and thereby reduce operation noise due to a pulsation of the hydraulic fluid discharged from the pump.

FIG. 3 and FIG. 4 are sections along III—III of FIG. 2, which are views for explaining a discharge operation and a suction operation by the plunger pump drive unit 5. In the housing 4, a plurality of operating passages 43 where a hydraulic fluid circulates are formed, unillustrated solenoid valves to open and close the operating passages 43 and plunger pumps 41a and 41b are fixedly disposed. Since the plunger pumps 41a and 41b have basically the same structure, description will be given of the plunger pump 41a in the following. The plunger pump 41a has a cover-like exit chamber body 52 inserted in an attaching hole 48 formed in the housing 4, a pump chamber plunger 62, and a plunger 71 inserted so as to be slidable on the inner wall of the pump chamber plunger 62. The exit chamber body 52, pump chamber plunger 62, and plunger 71 are, by fitting annular seal members C1, C2, C3, C4, and C5 made of a rubber composition to annular grooves formed on their outer wall surfaces, fluid-tightly sealed.

The plunger 71 is formed in a bottomed cylindrical shape whose one end is opened, and an interior space thereof is formed as an entrance chamber 70. In addition, an exit chamber 50 is formed in a space between the exit chamber body 52 and pump chamber plunger 62, and in a space between the pump chamber plunger 62 and plunger 71, a pump chamber 60 is formed.

The entrance chamber 70 is formed by a hole which communicates a plurality of second suction opening portions 72, 72 . . . opened through a cylindrical outer circumferential wall of the plunger 71 with a first discharge opening portion 74 formed on one end of the plunger 71. At the first discharge opening portion 74, a funnel-like first valve seat 73 whose diameter increases toward the pump chamber 60 is formed, and a suction valve 69 of a spherical valve is disposed so as to be seatable. The suction valve 69 is always urged to the first valve seat 73 side by a first valve spring member 68 disposed between the same and inner wall surface of the pump chamber plunger 62, and closes the first discharge opening portion 74. In addition, the plunger 71 is urged to the plunger pump drive unit 5 by a first spring member 67 disposed between the same and the inner wall surface of the pump chamber plunger 62.

The pump chamber 60 is formed in a space between the inner wall of the pump chamber plunger 62 formed in an approximately cylindrical shape and plunger 71. At an opening end portion of the pump chamber plunger 62, a second discharge opening portion 66 having a pinched-in narrow inside diameter and a funnel-like second valve seat 65 whose diameter increases from the second discharge opening portion 66 to the exit chamber 50 side are formed. A spherical discharge valve 59 to be seated on the second valve seat 65 closes the second discharge opening portion 66 by use of a second valve spring member 57 whose one end is restricted at a second spring receiving member 58 fixed by caulking to the opening end portion of the pump chamber plunger 62.

The exit chamber 50 is formed in a space between the exit chamber body 52 and pump chamber plunger 62. The exit chamber body 52 is disposed at the opening end of an attaching hole 48 while being restricted from shifting outside the housing 4, and this is also restricted from shifting inside the housing 4 by a second spring member 54 disposed between the exit chamber body 52 and pump chamber plunger 62. Accordingly, the pump chamber plunger 62 is urged inside the housing 4 by the exit chamber body 52 and second spring member 54, and is fixedly disposed substantially inside the housing 4.

The plunger pump drive unit 5 for driving the plunger 41a and 41b has an output shaft 22 of an electric motor 2 extended from the electric motor 2 to the inside of the housing 4 and rollers 26a and 26b, which are rolling elements brought in contact with a part of the output shaft 22. The output shaft 22 is, while using its both end portions as support portions 23a and 23b, rotatably supported on the housing 4 via ball bearings 24a and 24b. A cam portion 220 is formed between the support portions 23a and 23b, and at both sides of the cam portion 220, cylindrical rollers 26a and 26b are disposed in contact. The upper and lower end portions of the rollers 26a and 26b are formed in a spherical shape and are guided to slide by a first guide member 42a and a second guide member 42b. In addition, the sidewalls of the rollers 26a and 26b are, as shown in FIG. 3 and FIG.

4, guided to slide by a guide groove 47 formed on the first guide member 42 so as to advance and retract with respect to the plungers 71 and 71.

As a result of a rotation of the cam portion, the plunger 71 repeats a discharge and suction of the hydraulic fluid.

In the present embodiment, two plungers 71 are disposed so as to alternately repeat a discharge and suction of the hydraulic fluid, respectively. Namely, in a case where one plunger 71 has been brought in contact with the discharge region of the cam portion, the other plunger is in contact with the suction region of the cam portion. Accordingly, discharge operations of the respective plungers 71 do not overlap, thus pulsation due to the discharges can be dispersed.

As shown in FIG. 5, the cam portion 220 has an approximately triangular prism shape whose cross section is an approximately equilateral triangle where a discharge region and a suction region are alternately formed. On the outer circumferential surface of the cam portion 220, cam faces to be brought in contact with the roller 26a and 26b are formed. The cam portion 220 is rotated clockwise when the support portion 23b side is viewed from the support portion 23a side in FIG. 5. Of the cam faces, from the respective vertexes of the approximately triangular form, clockwise, to parts of the respective sides of the approximately triangular form closest to the central rotation axis are formed as suction cam faces 222 of suction regions. And, of the cam faces, from the parts of the respective sides of the approximately triangular form closest to the central rotation axis, counterclockwise, to the respective vertexes of the approximately triangular form are formed as discharge cam faces 224 of discharging cam regions.

Next, operations of the plunger pump drive unit 5 and plunger pump 41 will be described by use of FIG. 3 and FIG. 4.

First, a suction operation will be described. In FIG. 3, when the output shaft 22 is rotated in the arrow direction by activating the electric motor 2, the cam portion 220 formed on the output shaft 22 is rotated. Then, the roller 26a retracts while rolling along suction cam face 222 formed on the outer circumferential surface and reaches a condition of FIG. 4. During this suction operation, with the roller 26a, an end portion 76 of the plunger 71 is always brought in contact by the first spring member 67 and is slidably in contact by rolling. Accordingly, with the retracting of the roller 26a in the center direction of the output shaft 22, the plunger 71 also retracts. As shown in FIG. 4, as a result of the retraction of the plunger 71, since the pump chamber 60 expands, the pressure is reduced, and the suction valve 69 is opened due to a differential pressure from the fluid pressure of the hydraulic fluid of the entrance chamber 70. When the suction valve 69 is opened, the hydraulic fluid passes through a first suction opening portion 64 of the pump chamber plunger 62 from the suction port 44 of the operating passage 43 and is suctioned into the pump chamber 60 via the second suction opening portion 72 of the plunger 71.

Next, a discharge operation will be described. When the output shaft 22 and cam portion 220 are further rotated, the pump chamber 60 finishes expanding, and the suction valve 69 is seated on the first valve seat 73 of the first discharge opening portion 74 to be closed. The roller 26a advances while rolling along the discharge cam face 224 and reaches a condition shown in FIG. 3. During this discharge operation, the plunger 71 is pressed and moved while being slidably in contact by rolling of the roller 26a and advances while compressing the first spring member 67 and the hydraulic fluid inside the pump chamber 60. The hydraulic fluid suctioned into the pump chamber 60 is, while the discharge valve 59 compresses the second valve spring member 57 and is opened by a compressing operation of the plunger 71, discharged into the exit chamber 50 via the second discharge opening portion 66. The hydraulic fluid discharged from the plunger pump 41a passes through an opening portion of the spring receiving portion 58 and flows into the operating passage 43 via a discharge port 46.

Since, in the cam portion 220, the suction cam surfaces 222 and discharge cam surfaces 224 are provided at three positions, respectively, by one rotation of the output shaft 22 of the plunger pump drive unit 5, the plunger pump 71 can repeat three suctions and discharges. Vibration of the electric motor 2 as in the conventional eccentric shaft is reduced. In addition, since the plunger pump 71 carries out three-time discharge operations by one rotation of the output shaft 22, it also becomes possible to reduce the rotation speed of the electric motor 2, thus vibration and operation noise of the electric motor 2 can be reduced.

In addition, in the present embodiment, since the cross sectional shape of the cam portion is formed in an approximately triangular form, when the plunger pump 41a carries out a suction operation, the plunger pump 41b carries out a discharge operation, thus the discharge and suction operations do not overlap, and pulsation can also be suppressed. Although the approximately triangular shape in the present embodiment has the respective vertexes as arcs, the respective sides are not limited to straight lines but can be in large arc forms as long as three discharge cam faces and three suction cam faces are arranged at even intervals. In addition, with regard to an arrangement of the plunger pump drive unit 5 and respective plunger pumps, if the discharge operations of the respective plunger pumps do not overlap, these can be appropriately arranged while taking an arrangement of other hydraulic components into consideration.

Here, the present invention is not limited to the present embodiment but can be modified into various modes within the spirit of the present invention.

For example, in the above-described embodiment, although cylindrical rollers have been used as rolling elements, without being limited thereto, rolling elements such as spherical ball bearings can be appropriately employed.

In the above-described embodiment, although the cam portion 220 has been formed as a part of the output shaft 22 of the electric motor 2, without being limited thereto, the cam portion may be formed on another rotation axis portion which is driven to rotate by a rotation of the output shaft 22 and is engaged with, for example, a gear wheel or the like.

In addition, in the above-described embodiment, for the cam portion 220, although the cam faces have been formed on the wall surface of an approximately triangular prism shape, these are not limited to faces as long as the cam portion has a suction region and a discharge region alternately.

Furthermore, in the above-described embodiment, although the cam portion 220 has had an approximately triangular cross section, an equilateral triangle is desirable, and it is also possible to employ another polygon while considering the discharging amount and arrangement space.

What is claimed is:
1. A plunger pump, comprising:
   a plunger pump unit including a pump chamber and at least one plunger for pressing a hydraulic fluid in the pump chamber to perform a discharging operation of the hydraulic fluid;
   a motor;

a cam portion driven by the motor to rotate and press the at least one plunger; and a rolling element structured and arranged to roll in a guide groove between the cam portion and the at least one plunger;

wherein the cam portion has at least two discharge regions for pressing the at least one plunger and a suction region formed between the discharge regions; and the at least one plunger performs the discharging operation two times or more within one revolution of the cam portion.

2. The plunger pump as claimed in claim 1, wherein the cam portion has an approximately triangular cross section in which the discharge regions are formed at three positions.

3. The plunger pump as claimed in claim 1, wherein the motor includes an output shaft having an outer circumferential surface on which a cam face including the discharging region of the cam portion is formed;

the rolling element is disposed between the cam face and the at least one plunger;

the at least one plunger is constantly urged toward the rolling element being in contact therewith to bring the rolling element into contact with the cam face; and the output shaft is rotated by the motor so that the discharge regions press and move the at least one plunger via the rolling element to perform the discharging operation.

4. The plunger pump as claimed in claim 1, wherein the at least one plunger includes a first plunger and a second plunger;

the first plunger is brought in contact with the discharge region; and the second plunger is brought in contact with the suction region when the first plunger is brought in contact with the discharge region.

5. The plunger pump as claimed in claim 1, wherein the rolling element is slidingly disposed in the guide groove.

6. The plunger pump as claimed in claim 1, wherein the cam portion has an approximately triangular cross section comprising three convex portions connected by three straight-line portions.

7. The plunger pump as claimed in claim 1, wherein end portions of the rolling element comprise a spherical shape.

8. The plunger pump as claimed in claim 1, wherein sidewalls of the rolling elements are guided to slide by the grooves.

9. A plunger pump, comprising:

a pair of plunger pump units each including a pump chamber and a plunger for pressing a hydraulic fluid in the pump chamber to perform a discharging operation of the hydraulic fluid;

a cam portion for pressing the plungers of the pair of plunger pump units to perform the discharging operations while rotating;

respective rolling elements structured and arranged to roll in guide grooves between the cam portion and the plungers; and a motor that drives the cam portion to rotate;

wherein the cam portion alternately presses the plungers within one revolution.

10. The plunger pump as claimed in claim 9, wherein the plunger pump units are disposed at both sides of the cam portion.

11. The plunger pump as claimed in claim 9, wherein the rolling elements are slidingly disposed in the guide grooves.

12. The plunger pump as claimed in claim 9, wherein the cam portion has an approximately triangular cross section comprising three convex portions connected by three straight-line portions.

13. The plunger pump as claimed in claim 9, wherein end portions of the rolling elements comprise a spherical shape.

14. The plunger pump as claimed in claim 9, wherein sidewalls of the roiling element are guided to slide by the guide groove.

15. A plunger pump drive unit, comprising:

a motor;

a cam portion driven by the motor to rotate and press a plunger to perform a discharging operation of a hydraulic fluid; and a rolling element structured and arranged to roll in a guide groove between the cam portion and the plunger;

wherein the cam portion has at least two discharge regions for pressing the plunger and a suction region formed between the discharge region; and the plunger performs the discharging operation two times or more within one revolution of the cam portion.

16. The plunger pump drive unit as claimed in claim 15, wherein the rolling element is slidingly disposed in the guide groove.

17. The plunger pump drive unit as claimed in claim 15, wherein the cant portion has an approximately triangular cross section comprising three convex portions connected by three straight-line portions.

18. The plunger pump drive unit as claimed in claim 15, wherein end portions of the rolling element comprise a spherical shape.

* * * * *

UNITED STATES PATENT AND TRADEMARK OFFICE
CERTIFICATE OF CORRECTION

| | |
|---|---|
| PATENT NO. | : 7,273,003 B2 |
| APPLICATION NO. | : 10/858476 |
| DATED | : September 25, 2007 |
| INVENTOR(S) | : Yamashita et al. |

Page 1 of 1

It is certified that error appears in the above-identified patent and that said Letters Patent is hereby corrected as shown below:

In the Title page, References Cited Item (56), in the other publications section, in the printed patent, "Translation of Oddice Action" should be --Translation of Office Action--

Signed and Sealed this

Twenty-ninth Day of July, 2008

JON W. DUDAS
*Director of the United States Patent and Trademark Office*